(12) United States Patent
Butler

(10) Patent No.: US 8,181,732 B1
(45) Date of Patent: May 22, 2012

(54) Y SPLITTER FOR EXHAUST SYSTEMS

(76) Inventor: Boyd L. Butler, Sandy, UT (US)

( * ) Notice: Subject to any disclaimer, the term of this patent is extended or adjusted under 35 U.S.C. 154(b) by 271 days.

(21) Appl. No.: 12/347,757

(22) Filed: Dec. 31, 2008

Related U.S. Application Data

(60) Provisional application No. 61/009,764, filed on Dec. 31, 2007.

(51) Int. Cl.
*B60K 13/00* (2006.01)
*B60K 13/04* (2006.01)

(52) U.S. Cl. .............. 180/309; 285/132.1; 181/238; 181/239

(58) Field of Classification Search .......... 180/309; 60/313
See application file for complete search history.

(56) References Cited

U.S. PATENT DOCUMENTS

| | | | |
|---|---|---|---|
| 3,072,214 A | | 1/1963 | Deremer |
| 4,197,704 A | | 4/1980 | Date et al. |
| 4,800,719 A | | 1/1989 | Campbell |
| 4,800,720 A | | 1/1989 | Okada |
| 4,953,352 A | | 9/1990 | Campbell |
| 5,740,671 A | * | 4/1998 | Jones ........................ 60/323 |
| 6,283,162 B1 | | 9/2001 | Butler |
| 6,460,248 B2 | | 10/2002 | Butler |
| 6,478,340 B1 | * | 11/2002 | Butler ..................... 285/131.1 |
| 7,610,748 B2 | * | 11/2009 | Kono et al. ................. 60/276 |

FOREIGN PATENT DOCUMENTS

| | | |
|---|---|---|
| DE | 2 101 079 | 8/1972 |
| FR | 860 897 | 1/1941 |

* cited by examiner

*Primary Examiner* — J. Allen Shriver, II
*Assistant Examiner* — Erez Gurari
(74) *Attorney, Agent, or Firm* — Thorpe North & Western LLP

(57) ABSTRACT

A Y-pipe splitter for use on race cars, such as stock cars which race on oval tracks and sports cars which race on road course tracks, mounts to the lower frame or chassis of the car, and routes exhaust gasses from a Y-pipe assembly to a pair of tail pipes extending to the side of the car while providing improved ground clearance. The Y-pipe splitter includes first and second splitter tail pipe sections of a generally flattened oval cross-section with a longitudinally beveled inlet portions connectable to an outlet of the Y-pipe assembly and an outlet portion connectable to one of the tail pipes. The beveled inlet portions of the splitter tail pipe sections are affixed together along a respective edge of each thereof so as to merge together with respective centerlines thereof at an oblique angle to a single inlet opening which is connectable to the outlet opening of the Y-pipe assembly by affixing thereto.

11 Claims, 3 Drawing Sheets

Y SPLITTER FOR EXHAUST SYSTEMS

PRIORITY CLAIM

Priority is claimed to U.S. Provisional Patent Application Ser. No. 61/009,764 filed Dec. 31, 2007, which is hereby incorporated herein by reference in its entirety.

BACKGROUND OF THE INVENTION

1. Field of the Invention

The invention is in the field of exhaust systems for automobiles, and more specifically thin exhaust pipes for increased ground clearance on racing cars, such as stock cars, formula cars, sports cars, and the like, used on oval tracks or road course tracks.

2. Related Art

Race cars used in automobile racing are typically constructed such that only a minimal amount of clearance is maintained between the underside of the car and the surface of the roadway or track. This is done to lower the center of gravity of the car so as to improve car handling, increase resistance to rolling over, and minimize the drag due to air passing under the car. Likewise, such race cars typically have very stiff suspension systems which do not allow the car to travel as great a distance up and down nor side-to-side as a standard production car, thereby allowing less clearance between the car body and the ground. One of the problems encountered in lowering the race car closer to the race track is providing sufficient clearance between the car body and the race track for the car's exhaust system which is one of the lowest hanging components of a race car.

The problem is particularly acute on cars which race on oval race tracks, such as stock cars. The exhaust pipes of such race cars typically exit toward one or both sides of the car as compared to typical passenger cars which pipe the exhaust to the rear of the vehicle. Piping the exhaust to the side of the vehicle minimizes the length of the exhaust pipes to minimize the effects of exhaust gas back pressure which often lowers engine power output and overall engine performance. Additionally, side exhaust pipes keep the hot exhaust pipes away from the fuel cell so as to minimize the chance of a fuel fire.

Unfortunately, side exhaust pipes complicate ground clearance problems because the minimum ground clearance of the exhaust system typically occurs where the exhaust pipes cross under the longitudinally-extending main frame members of the chassis at the sides of the car. Stock cars typically race on oval tracks in a counter-clockwise rotational direction with centrifugal force causing the body and chassis of the car to lean toward the outside of the turn or toward the right side of the car. Thus, the ground clearance on the right side of the car is less during cornering and the greatest ground clearance results on the left side of the car during such cornering. However, since many cars are fueled on the left side, the exhaust pipes usually now extend to the right side of the car, the side with least clearance, to reduce the chances of fuel spilling onto the hot exhaust pipes during fueling and igniting to cause a fire.

The exhaust systems of many race cars include a pair of headers each including a plurality of primary exhaust pipes which connect at one end thereof to the cylinder block of an internal combustion engine at respective exhaust outlet ports of the engine and which converge into a single merge collector outlet at the opposite ends thereof. A secondary exhaust pipe connects the outlet of a respective merge collector to a boom tube or other type exhaust pipe, which forms a tailpipe extending from the outlet of a respective secondary exhaust pipe to the side of the car and to the atmosphere. Boom tube exhaust pipes provide a thin profile and were developed in an effort to increase the ground clearance of the exhaust system on race cars. The thin profile boom tube exhaust pipes extend from the outlets of the secondary exhaust pipes at a rearward, laterally outwardly-directed angle under the main frame members of the chassis. The outlet end of such boom tube exhaust pipes is typically manufactured in a squared-off or right angle end configuration and trimmed at installation to match exit angle and the side of the particular car on which it is installed. The secondary exhaust pipes can connect to separate tailpipes or to a single tailpipe, such as a single boom tube type tailpipe. In such instances, the inlet of the single boom tube connects to the outlets of each of the secondary exhaust pipes to combine the exhaust flow from each pipe into the single boom tube. Such exhaust systems can be made and mounted to a race car such that the entire exhaust system, including the inlets of the boom tube exhaust pipes, are at or above the lower plane of the bodies of the boom tube exhaust pipes to maximize ground clearance of the exhaust system.

In my U.S. Pat. Nos. 6,283,162 and 6,460,248, which are incorporated herein by reference, a flattened single or dual inlet boom tube exhaust pipe is disclosed for use on race cars, such as stock cars, which race on oval tracks or the like. The exhaust pipes mount to the secondary exhaust pipes of the exhaust system and to the lower frame or chassis of the car, and route exhaust gasses to one or both sides of the car while providing improved ground clearance between the exhaust pipe or pipes and the surface of the race track. The construction of the boom tube exhaust pipes comprise single or dual slightly flattened circular inlets which lead exhaust gasses into a flattened profile body constructed of formed sheet metal half shells, with the inlets at or above the lower plane of the body. One or more formed sheet metal structural ribs extend through the body and into the inlets and one or more spacer ribs support the half shells within the body. The boom tube exhaust pipes can be made with internal baffles or spiral acoustic traps so as to also be an acoustic muffler.

It is known that the performance of a race car engine can be increased in many instances by providing a connection between the secondary exhaust pipes in the exhaust system. As shown in FIGS. 17, 19, and 20 of my above-referenced U.S. Pat. Nos. 6,283,162 and 6,460,248, a crossover pipe extending between the two secondary exhaust pipes can be used to form an H-pipe assembly. A similar connection can be formed by bending the secondary exhaust pipes so that the pipes come together for a short distance in side-by-side relationship and then separate again. A hole is cut in the side of each of the two pipes where they come together and the pipes are joined, such as by welding around the mating holes, so that the interiors of the two pipes communicate through the hole. This type of connection is commonly called an X-pipe connection since the pipes generally form an X shape where they come together. A connection where multiple exhaust pipes are connected to one end of a chamber or collector and two tailpipes are connected to the opposite end of the chamber or collector is shown in Campbell U.S. Pat. No. 4,953,352. These various cross flow regions described between the secondary exhaust pipes are designed to allow fluid communication or cross flow of the exhaust gasses from each of the headers of the engine prior to entering the tailpipes. Such cross flow communication is desirable for reducing peak pressures and excessive back pressure build up of the exhaust gasses to allow more efficient exiting of exhaust gases. These arrangements can be used with one or two tailpipes as shown in FIGS. 17, 19, and 20 of my above-referenced U.S. Pat. Nos. 6,283,162 and 6,460,248.

To further improve the crossover configurations of secondary exhaust pipes when combining the exhaust flow from two secondary exhaust pipes into a single boom tube type tailpipe, I invented a Y-pipe assembly described in my U.S. Pat. No. 6,478,340, which is incorporated herein by reference. The Y-pipe assembly includes the secondary exhaust pipes and attaches to the respective ends of a pair of primary exhaust pipes or header assemblies and lead exhaust gasses from the engine of the race car to the inlet of a single boom tube exhaust pipe which mounts to the bottom portion of the frame or chassis of the race car. The Y-pipe assembly comprises a first secondary exhaust pipe comprising an inlet portion connectable to one of the header assemblies for receiving exhaust gasses therefrom and a beveled outlet portion, and a second secondary exhaust pipe comprising an inlet portion connectable to the other of the header assemblies for receiving exhaust gasses therefrom and a beveled outlet portion. The beveled outlet portions of the secondary exhaust pipes are affixed together along a respective edge of each thereof so as to merge together with respective centerlines thereof at an oblique angle to a single outlet opening which is connectable to the inlet of the boom tube. The respective secondary exhaust pipes are typically longitudinally tapered in the vertical direction with the inlet portions of the respective secondary exhaust pipes being substantially round in cross-section so as to closely fit to the respective header assembly and with the outlet portions flattened so as to be thinner at the outlet portions to form a flattened merged single outlet opening for improved ground clearance. Further, the single outlet opening of the merged outlet portion is configured to fit the inlet portion of the single boom tube exhaust pipe. The Y-pipe assembly of my U.S. Pat. No. 6,478,340 provides improved performance of race car engines and an improved exhaust system configuration for providing exhaust system clearance, but is not designed for use with two tailpipes.

SUMMARY OF THE INVENTION

The present invention provides for the attachment of two tailpipes to a Y-pipe assembly to provide the advantages of the Y-pipe assembly to an exhaust system using two tailpipes such as two customary tailpipes or two boom tube exhaust pipe tailpipes. The invention comprises a Y-pipe splitter having a single inlet for attachment to the single outlet of a Y-pipe assembly normally attached to a single tailpipe. However, rather than attaching a single tailpipe to the single outlet of the Y-pipe assembly, the single inlet of the Y-pipe splitter attaches to the single outlet of the Y-pipe assembly. The Y-pipe splitter has two outlets and a tailpipe, such as a customary tailpipe or a boom tube exhaust pipe, is attached to each of the Y-pipe splitter outlets to provide an exhaust system having two tailpipes. The Y-pipe assembly is attached to the respective ends of a pair of primary exhaust pipes or header assemblies which lead exhaust gasses from the engine of a race car or other motor vehicle to the Y-pipe assembly. The Y-pipe assembly then takes the exhaust gases from the separate primary exhaust pipes and combines them in a flattened merged outlet portion to which a single boom tube type or other type tail exhaust pipe is normally connected. With the current invention, rather than connecting a tailpipe to the single outlet of the Y-pipe assembly, the single inlet of the Y-pipe splitter of the present invention is attached to the single outlet end of the Y-pipe assembly. The Y-pipe splitter is configured to split into two outlet openings to attach to inlets of a pair of exhaust pipes which mount to the bottom portion of the frame or chassis of the motor vehicle as tailpipes. Thus, while the Y-pipe assembly takes the exhaust gases from the separate primary exhaust pipes and combines them in a flattened merged portion which reduces exhaust pressure peaks in the exhaust system and reduces back pressure build up in the system, the Y-pipe splitter splits the exhaust from the flatten merged portion of the Y-pipe assembly and splits it again into two separate exhaust streams which exhaust to the atmosphere through the two exhaust pipes attached to the two outlets of the Y-pipe splitter. The combination of the Y-pipe assembly, along with the Y-pipe splitter and two exhaust pipes can provide the same improved ground clearance for the motor vehicle as the Y-pipe assembly and single exhaust pipe of my prior U.S. Pat. No. 6,478,340, as well as the advantages of reduced exhaust pressure peaks and reduced back pressure provided by the Y-pipe assembly and single exhaust pipe.

The Y-pipe splitter of the invention includes a first splitter tail pipe section of a generally flattened oval cross-section. The first tail pipe section includes a longitudinally beveled inlet portion connectable to the outlet of the Y-pipe assembly for receiving exhaust gasses therefrom. The first tail pipe assembly also includes an outlet portion connectable to the inlet of one of the tail pipes. The Y-pipe splitter also includes a second splitter tail pipe section of a generally flattened oval cross-section. The second tail pipe section has a longitudinally beveled inlet portion connectable to the outlet of the Y-pipe assembly for receiving exhaust gasses therefrom, and an outlet portion connectable to the inlet of the other tail pipe. The beveled inlet portions of the first and second splitter tail pipe sections are affixed together along a respective edge of each thereof so as to merge together with respective centerlines thereof at an oblique angle to a single inlet opening which is configured to connect to the outlet opening of the Y-pipe assembly by affixing thereto. As the beveled inlet portions of the first and second splitter tail pipe sections merge together, they form an inlet portion of the Y-pipe splitter which is a continuation of the flattened merged outlet portion of the Y-pipe assembly.

A Y-pipe assembly works to draw exhaust gasses from the engine cylinders by means of the pressure pulses therefrom which flow in a generally alternating timing from the respective engine cylinders, through the headers, through the secondary exhaust pipes of the Y-pipe assembly and into the merged outlet portion of the Y-pipe assembly and into the single tubular inlet and the body of the exhaust tailpipe or boom tube exhaust pipe. The flow of the alternating pressure pulses are accelerated as they merge in the outlet portion of the Y-pipe assembly wherein the flow is allowed to expand, and further expand in the inlet and body of the tailpipe.

As a pressure pulse of exhaust gasses flows through one of the secondary exhaust pipes of the Y-pipe assembly and into the merged outlet portion, the inertia of the accelerating flow of exhaust gasses passing the opening thereinto of the other secondary exhaust pipe, a partial vacuum or lower pressure is briefly created within such other secondary exhaust pipe. When the next cylinder exhausts into such other secondary exhaust pipe forming a pressure pulse of exhaust gasses, the flow thereof is accelerated due to the lower pressure therein created by the previous pressure pulse such that more exhaust is removed from the exhausting engine cylinder. This increased removal of exhaust gasses from the cylinders of the engine improves engine performance by allowing space for a larger amount of fresh fuel/air mixture to enter the cylinder for the next firing of the cylinder. The Y-pipe splitter works in conjunction with the Y-pipe assembly to provide a joined inlet portion into the Y-pipe splitter into which the exhaust gases flow from the outlet portion of the Y-pipe assembly as they would into a single boom tube type exhaust tailpipe from where the splitter tailpipe sections of the Y-pipe splitter direct the flow and control the expansion of exhaust gasses to direct the exhaust gases to the pair of separate tailpipes. The single outlet of the Y-pipe assembly and the single inlet of the Y-pipe splitter allow controlled mixing of the exhaust gasses therebetween for fine tuning of the exhaust flows.

The invention further provides for a Y-pipe exhaust crossover including a Y-pipe assembly and a Y-pipe splitter, both being of any of the types described above and affixed together. The Y-pipe assembly is of suitable configuration for attachment to the respective ends of primary exhaust pipes or header assemblies which lead exhaust gasses away from the engine of a motor vehicle. The Y-pipe splitter is of suitable configuration for attachment to the outlet end of the Y-pipe assembly which leads exhaust gasses from the engine of a motor vehicle. The Y-pipe splitter also has a pair of splitter tail pipe sections suitable for attachment to a pair of tail pipes for expelling the exhaust gasses into the atmosphere.

The invention further provides for a vehicle exhaust system which leads exhaust gasses from the engine of a motor vehicle, and which is attachable to the bottom portion of the frame or chassis of the motor vehicle to provide improved ground clearance to the vehicle. The vehicle exhaust system includes a Y-pipe assembly having a pair of inlet ends attachable to the respective ends of a pair of primary exhaust pipes or header assemblies of the engine, and a single outlet end. The vehicle exhaust system also includes a Y-pipe splitter having a single inlet end attachable to the outlet end of the Y-pipe assembly and a pair of outlet ends. Additionally, each of a pair of tail pipes has an inlet end attachable to one of the pair of outlet ends of the Y-pipe splitter and an outlet end for venting exhaust gasses to the atmosphere. The pair of tail pipes is oriented in a spaced apart, parallel relationship to one another with the outlet ends of each tail pipe positioned on a common side of the motor vehicle.

BRIEF DESCRIPTION OF THE DRAWINGS

The best mode presently contemplated for carrying out the invention is illustrated in the accompany drawings, in which.

DETAILED DESCRIPTION

Figure 1:
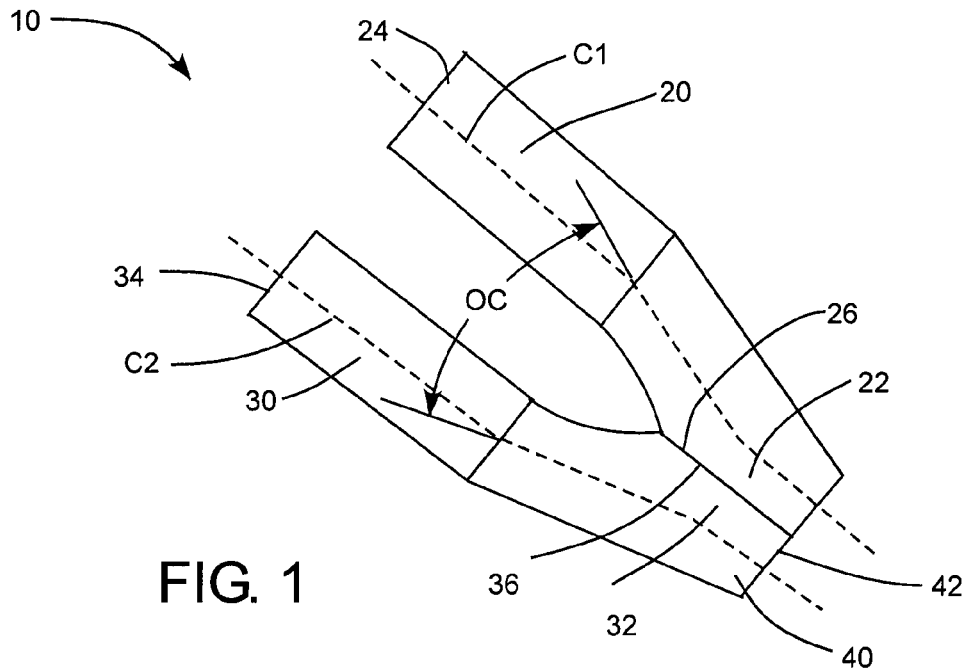
FIG. 1 is a top view of a Y-pipe splitter in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 2:
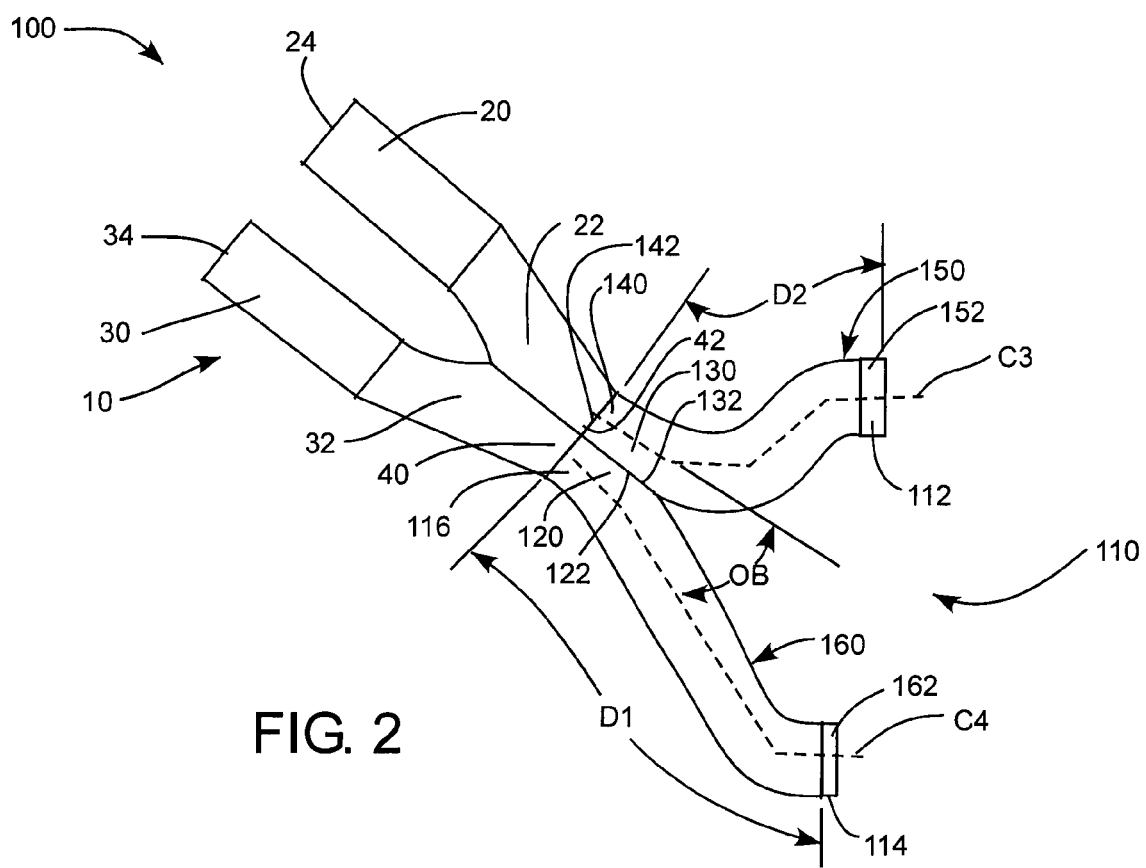
FIG. 2 is a top view of a Y-pipe exhaust crossover system in accordance with an embodiment of the present invention, including the Y-pipe splitter of FIG. 1.
Figure 3:
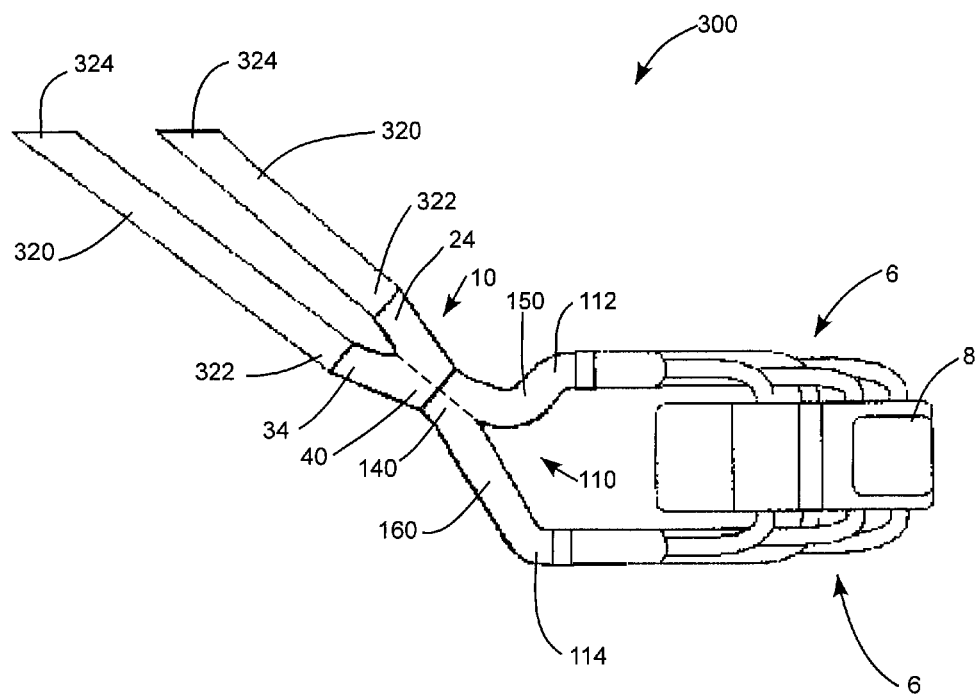
FIG. 3 is top view of a Y-pipe vehicle exhaust system in accordance with another embodiment of the present invention, including the Y-pipe exhaust crossover system of FIG. 2.

As illustrated in FIGS. 1-3, a Y-pipe splitter, indicated generally at 10, is shown in accordance an embodiment of the present invention for attachment to an end of a Y-pipe assembly 110 (FIG. 2). The Y-pipe assembly is attachable to primary exhaust pipes or header assemblies 6 (FIG. 3) which lead exhaust gasses from the engine 8 (FIG. 3) of a motor vehicle. The Y-pipe splitter 10 is also attachable to an inlet 322 (FIG. 3) of each of a pair of customary tail pipes 320 (FIG. 3) which mount to the bottom portion of the frame or chassis of the motor vehicle. It will be appreciated that the customary tailpipes 320 (FIG. 3) can be replaced by or interchanged with a pair of boom tube exhaust pipes (not shown). The Y-pipe splitter 10, Y-pipe assembly 110, and tail pipes 320 are configured geometrically to provide improved ground clearance for the motor vehicle. The Y-pipe splitter 10 includes a first splitter tail pipe section 20, and a second splitter tail pipe section 30 joined together to form a single inlet section 40.

Figure 6:
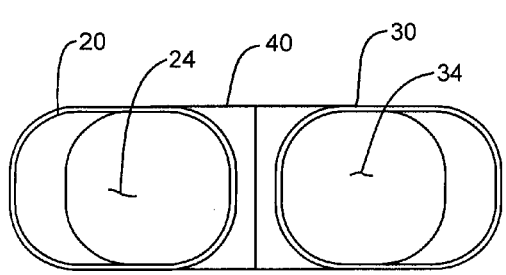
FIG. 6 is rear view of the Y-pipe splitter of FIG. 1.

The first splitter tail pipe section 20 is a tube with a generally flattened oval cross-section, see FIG. 6. The first splitter tail pipe section 20 has a longitudinally beveled inlet portion 22 connectable to a corresponding outlet of the Y-pipe assembly for receiving exhaust gasses from the Y-pipe assembly. The first splitter tail pipe section 20 also has outlet portion 24 connectable to one of the tail pipes.

The second splitter tail pipe section 30 is also a tube with a generally flattened oval cross-section (FIG. 6). The second splitter tail pipe section 30 has a longitudinally beveled inlet portion 32 connectable to a corresponding outlet of the Y-pipe assembly for receiving exhaust gasses from the Y-pipe assembly. The second splitter tail pipe section 30 also has outlet portion 34 connectable to one of the tail pipes.

The beveled inlet portions 22 and 32 of the splitter tail pipe sections 20 and 30, respectively, are affixed together along a respective edge 26 and 36 of each of the splitter tail pipe sections so as to merge together with respective centerlines "C1" and "C2" thereof at an oblique angle "OC". The joined beveled inlet portions 22 and 32 form a single inlet opening 42 which is connectable to the outlet opening of the Y-pipe assembly by affixing thereto. The single inlet opening 42 has a substantially flat oval cross section with a somewhat flattened circular shape (FIG. 7) for attachment to comparably configured outlet of a Y-pipe assembly and includes a flattened lower surface 44.

As illustrated in FIG. 2, a Y-pipe exhaust crossover system, indicated generally at 100, is shown in accordance with another embodiment of the present invention for use in leading exhaust gasses from an engine of a motor vehicle to the inlets of a pair of tail pipes which mount to the bottom portion of the frame or chassis of the motor vehicle. The Y-pipe exhaust crossover system 100 includes the Y-pipe assembly 110 and the Y-pipe splitter 10.

The Y-pipe assembly 110 has a pair of secondary exhaust pipes 150 and 160 having respective inlet ends 112 and 114 attachable to the respective outlet ends of primary exhaust pipes or header assemblies 6 coupled to the engine (see FIG. 3). The Y-pipe assembly also has a single outlet end 140. The pair of secondary exhaust pipes 150 and 160 of the Y-pipe assembly further includes longitudinally beveled outlet portions 120 and 130 affixed together along a respective edge, 122 and 132 respectively, of each thereof so as to merge together with respective centerlines "C3" and "C4" respectively, thereof at an oblique angle "OB" to form a single outlet opening 142 in the outlet end 140 which is connectable to the inlet opening 42 of the Y-pipe splitter 10 by affixing thereto, such as by welding.

The Y-pipe assembly includes a pair of curved secondary exhaust pipes 150 and 160 having respective flared inlet portions 112 and 114, and partially flattened or oval, longitudinally beveled outlet portions 120 and 130 which are welded together at respective edges 122 and 132 at an oblique angle "OB" preferably of between about zero degrees to about sixty degrees. The inlet portions 112 and 114 can be staggered, or aligned side-by-side so as to fit the exhaust system of the particular motor vehicle. The secondary exhaust pipes 150 and 160 are preferably of substantially equal lengths "D1" and "D2" as measured along respective centerlines "C3" and "C4", with the secondary exhaust pipe 150 being curved further than necessary to equalize the lengths "D1" and "D2".

Figure 4:
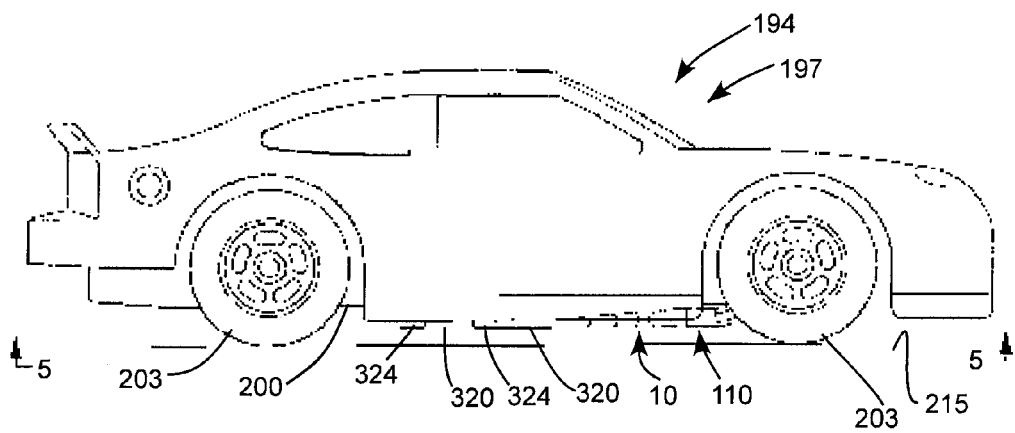
FIG. 4 is a side elevational view of a race car having an internal combustion engine with a Y-pipe vehicle exhaust system of FIG. 3.

The secondary exhaust pipe 160 may be manufactured as two individual pieces of pipe which are welded together following bending and flaring thereof for ease of manufacture. Likewise, the secondary exhaust pipe 150 may be manufactured as three individual pipes which are welded together following bending and flaring thereof for ease of manufacture. The secondary exhaust pipes 150 and 160 are shaped so as to be thinner at one end or longitudinally tapered, being of generally round cross-section at respective flared inlet portions 112 and 114 tapering to generally flattened round cross-section at respective beveled outlet portions 120 and 130 thereof, allowing for increased ground clearance (FIG. 4). The secondary exhaust pipes 150 and 160 are typically made of mild steel or stainless steel tubing which is flared at respective inlet portions 112 and 114, then a portion of each of which is partially flattened on a longitudinal taper. Such Y-pipe assemblies and manufacturing thereof are described in greater detail in my U.S. Pat. No. 6,478,340 which is herein incorporated by reference in its entirety for all purposes.

Figure 7:
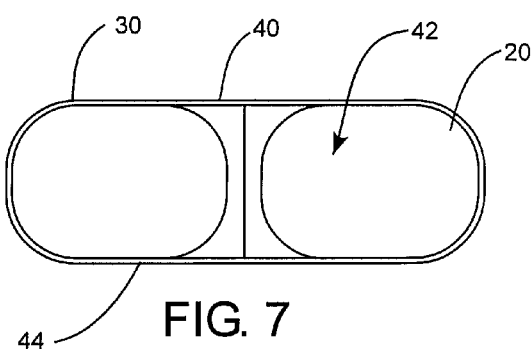
FIG. 7 is a front view of the Y-pipe splitter of FIG. 1.

The Y-pipe splitter 10 is described above and shown in FIG. 1. Specifically the Y-pipe splitter 10 has a single inlet end 40 attachable to the single outlet end 140 of the Y-pipe assembly 110. The Y-pipe splitter 10 also has a pair of outlet ends 24 and 34 of tail pipe sections 20 and 30 attachable to a pair of tail pipes 320 (FIG. 3). Each of the pair of inlet portions 22 and 32 of the Y-pipe splitter further includes a longitudinally bevel affixed together along a respective edge 26 and 36 of each thereof so as to merge together with respective centerlines "C1" and "C2" thereof at an oblique angle "OC" to form a single inlet opening 42 in the inlet end which is connectable to the outlet opening 142 of the Y-pipe assembly by affixing thereto. The Y-pipe splitter 10 is typically made of mild steel or stainless steel tubing which is partially flattened to form a flattened oval cross section as shown in FIGS. 6 and 7.

Together the Y-pipe splitter 10 and the Y-pipe assembly 110 form the Y-pipe exhaust crossover system 100 of the present invention. The inlet to the Y-pipe splitter is configured to form a flatten merged inlet portion similar to the flattened merged outlet portion of the Y-pipe assembly and to form an extension of the flattened merged outlet portion of the Y-pipe assembly wherein the merged exhaust streams are separated into two individual exhaust streams to be directed to the two individual tailpipes. The similar flattened merged outlet and inlet portions form a merged crossover portion of the Y-pipe exhaust crossover system that promote reduction in peak pressures in the exhaust system and reduced exhaust system back pressures in addition to any other exhaust system crossovers or, in most cases, in place of other crossover connections. In addition, the combination of the Y-pipe assembly and Y-pipe splitter allow a flattened connection between the primary exhaust pipes or headers and the tailpipes allowing increased exhaust system clearance.

As shown in FIG. 3, a Y-pipe vehicle exhaust system, indicated generally at 300 is shown in accordance with an embodiment of the present invention, which lead exhaust gasses from the engine of a motor vehicle 8, and is attachable to the bottom portion of the frame or chassis 200 of the motor vehicle and providing improved ground clearance to the vehicle. The vehicle exhaust system 300 includes a Y-pipe assembly 110 described above and shown in FIG. 2, a Y-pipe splitter 10 described above and shown in FIG. 1, and a pair of tail pipes 320.

The Y-pipe assembly 110 has a pair of inlet ends 112 and 114 attachable to the respective ends of a pair of primary exhaust pipes or header assemblies of the engine, indicated generally at 6, and a single outlet end 140. The Y-pipe splitter 10 has a single inlet end 40 attachable to the outlet end 140 of the Y-pipe assembly 110 and a pair of outlet ends 24 and 34.

Each of the pair of tail pipes 320 has an inlet end 322 attachable to one of the pair of outlet ends 24 and 34 of the Y-pipe splitter 10 and an outlet end 324 for venting exhaust gasses to the atmosphere. Each of the pair of tail pipes 320 are oriented in a spaced apart, parallel relationship to one another with the outlet ends 324 of each tail pipe positioned on a common side of the motor vehicle (FIG. 4). It will be appreciated that the tail pipes 320 can be common tailpipes, mufflers, boom tube exhaust pipes, or other types of tail pipes as known in the art. Boom tube tail pipes are described in greater detail in my previous U.S. Pat. No. 6,283,162 and No. 6,460,248, which are herein incorporated by reference in their entireties for all purposes.

Figure 5:
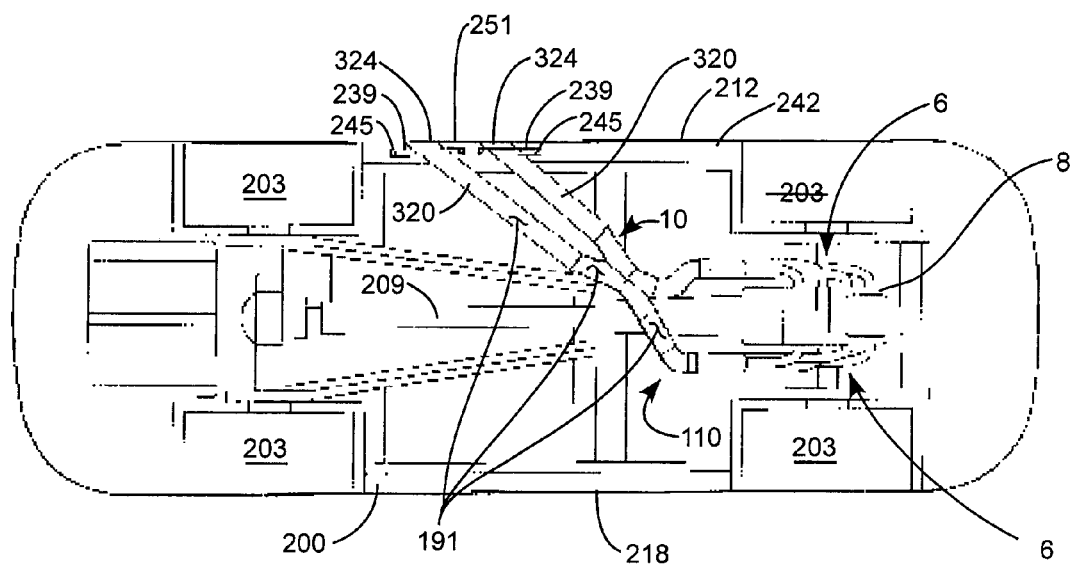
FIG. 5 is a bottom plan view taken along the line 5-5 of FIG. 4 showing the Y-pipe vehicle exhaust system connected to the engine and mounting to chassis of the car body.

Referring to FIGS. 4-5, therein is shown a typical installation of Y-pipe vehicle exhaust assembly 300 to a race car comprising a racing car 194. Racing car 194 includes a body 197 mounted on or integral with a frame or chassis 200 with a plurality of wheels 203. An internal combustion engine 8 powers racing car 194 through a drive train 209. Such racing cars generally race on oval tracks in a counter-clockwise rotational direction leaning toward the outside of the turn, or the right side 212 of stock car 194. Therefore, the greatest clearance between chassis 200 of stock car 194 and the track or ground surface 215 results on the left side 218 of racing car 194. As such, tail pipes 320 are typically mounted to the left side 218 of the car 194; however, some race circuit or track rules can require the tail pipes be mounted on the right side 212 of the car 194. Thus, in some situations the combination of ride height, type of track, and the design of the suspension and the stiffness thereof, Y-pipe assembly 110, Y-pipe splitter 10, and tail pipes 320 of Y-pipe vehicle exhaust assembly 300 might be reversed such that exhaust pipe exits 324 are positioned on the right side 212 of racing car 194. With the current invention, exhaust pipes can exit to either side of the car, as desired.

Exhaust gasses from engine 8 exit therefrom through a pair of left and right side headers comprising a plurality of left and right side primary exhaust pipes 6 which merge into respective left and right side merge collectors 233 and 236. Respective inlet portions 112 and 114 of secondary exhaust pipes 150 and 160 are clamped or welded to collectors 6. Tail pipes 300 are attached to chassis 200 of stock car 194 such as by means of a strap 239 or other such bracketry (not shown) which extends across the tail pipes and attaches to the car 194, such as to a main member 242 of chassis 200. Any suitable fastener, such as bolts 245, screws, or the like, can be disposed in a pair of threaded holes (not shown) in the main member 242. The Y-pipe vehicle exhaust assembly 300 is thus supported by secondary exhaust pipes 150 and 160 connected to respective headers of the engine 8, and by means of strap 239 supporting the tail pipes 320 immediately under chassis 200.

The Y-pipe assembly, Y-pipe splitter, and tail pipes all have a thin profile and flat bottom surface 191 that provides maximum ground clearance "B" while maintaining an adequate cross-sectional area for exhaust gasses to exit through a flattened outlet opening 324 of the tail pipes 320 so as to not create an unacceptable amount of exhaust gas back-pressure lowering the power output of engine 8. The tail pipes 320 are trimmed to fit the particular racing car 194 as at edge 251 removing the remaining portion (not shown). An optional H-pipe or exhaust gas crossover pipe (not shown) can be welded, or removably connected by means of welding standard fittings (not shown), to connect a pair of holes (not shown) one in the side of each of secondary exhaust pipes 29 and 32. Such crossover pipes allow exhaust gasses to crossover between secondary exhaust pipes 150 and 160 to better balance the exhaust gas pressures therein during the firing of the cylinders of engine 8 dumping exhaust gasses from headers through both respective secondary exhaust pipes 150 and 160 as to reduce exhaust gas backpressure to engine 8 by allowing more efficient exiting of such exhaust gasses.

The Y-pipe assemblies, Y-pipe splitters, and tail pipes or boom tube exhaust pipes, and exhaust systems, all comprise the inventive concept of the invention with many variations thereof possible while still staying within the overall inventive concept. For example, other variations of the invention include the secondary exhaust pipes each being constructed of a single piece of tubing or multiple pieces of tubing affixed together such as by welding or brazing.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. A Y-pipe exhaust crossover which leads exhaust gasses from an engine of a motor vehicle to the inlets of a pair of tail pipes which mount to the bottom portion of the frame or chassis of the motor vehicle, comprising:
   a) a Y-pipe assembly for attachment to the respective ends of a pair of primary exhaust pipes or header assemblies, the Y-pipe further comprising:
      i) a first secondary exhaust pipe of a generally rounded cross-section comprising an inlet portion connectable to one of the header assemblies for receiving exhaust gasses therefrom and a longitudinally beveled outlet portion;
      ii) a second secondary exhaust pipe of a generally rounded cross-section comprising an inlet portion connectable to the other of the header assemblies for receiving exhaust gasses therefrom and a longitudinally beveled outlet portion; and
      iii) wherein said beveled outlet portions of said secondary exhaust pipes are affixed together along a respective edge of each thereof so as to merge together with respective centerlines thereof at an oblique angle to a single outlet opening of a generally flattened oval cross-section; and
   b) a Y-pipe splitter attached to the single outlet opening of the Y-pipe assembly and adapted for attachment to an inlet of each of the pair of tail pipes, the Y-pipe splitter further comprising:
      i) a first splitter tail pipe section comprising a longitudinally beveled inlet portion connectable to an outlet of the Y-pipe assembly for receiving exhaust gasses therefrom and outlet portion connectable to one of the tail pipes;
      ii) a second splitter tail pipe section comprising a longitudinally beveled inlet portion connectable to an outlet of the Y-pipe assembly for receiving exhaust gasses therefrom and outlet portion connectable to one of the tail pipes; and
      iii) wherein said beveled inlet portions of said splitter tail pipe sections are affixed together along a respective edge of each thereof so as to merge together with respective centerlines thereof at an oblique angle to a single inlet opening of a generally flattened oval cross-section substantially matching the flattened oval cross-section of the single outlet of the Y-pipe assembly, and said single inlet opening of the Y-pipe splitter is affixed directly to the single outlet opening of the Y-pipe assembly to create a flow path for exhaust gases from the inlet portions of the first and second secondary exhaust pipes of the Y-pipe assembly to the single outlet opening of the Y-pipe assembly directly into the single inlet opening of the Y-pipe splitter and to the outlet portions of the Y-pipe splitter.

2. The Y-pipe exhaust crossover of claim 1, wherein said secondary exhaust pipes are substantially the same length as measured along said respective longitudinal centerlines thereof.

3. The Y-pipe exhaust crossover of claim 1, wherein said respective secondary exhaust pipes are longitudinally tapered in the vertical direction so as to be thinner at said outlet portion than said inlet portion thereof.

4. The Y-pipe exhaust crossover of claim 1, wherein the inlet portion of the respective secondary exhaust pipes are substantially round in cross section.

5. The Y pipe exhaust crossover of claim 1, wherein the pair of tail pipes includes a pair of boom tube exhaust pipes oriented in a parallel, spaced apart relation to one another.

6. The Y-pipe exhaust crossover of claim 1, wherein the outlet portions of each of the first splitter tail pipe section and the second splitter tail pipe section are substantially round in cross section.

7. The Y-pipe exhaust crossover of claim 1, wherein the outlet portions of each of the first splitter tail pipe section and the second splitter tail pipe section have a substantially flat oval cross section.

8. The Y-pipe exhaust crossover of claim 1, wherein the pair of tail pipes includes a pair of exhaust pipes oriented in a parallel, spaced apart relation to one another.

9. The Y-pipe exhaust crossover of claim 1, wherein the Y-pipe exhaust crossover is adapted to be installed in an automobile with the first and second secondary exhaust pipes attached to respective ends of the of primary exhaust pipes or header assemblies, and wherein the secondary exhaust pipes of the Y-pipe assembly are configured to direct the single outlet opening toward a single side of the automobile, and wherein the pair of tail pipes both extend to the single side of the automobile.

10. The Y-pipe exhaust crossover of claim 9, wherein one of the secondary exhaust pipes is curved to lengthen and substantially equalize the length along the longitudinal centerline thereof to that of the other secondary exhaust pipe.

11. The Y-pipe exhaust crossover of claim 1, wherein the single inlet opening of the Y-pipe splitter is affixed directly to the single outlet opening of the Y-pipe assembly by welding the single inlet opening of the Y-pipe splitter directly to the single outlet opening of the Y-pipe assembly.

* * * * *